(12) United States Patent
Gadmer et al.

(10) Patent No.: US 10,845,547 B2
(45) Date of Patent: Nov. 24, 2020

(54) OPTICAL CONNECTOR HAVING PIVOTABLE CAP PROTECTING FERRULE

(71) Applicant: HUBER+SUHNER AG, Herisau (CH)

(72) Inventors: Laif Gadmer, Uzwil (CH); Dirk Duhm, Flawil (CH)

(73) Assignee: HUBER+SUHNER AG, Herisau (CH)

( * ) Notice: Subject to any disclaimer, the term of this patent is extended or adjusted under 35 U.S.C. 154(b) by 51 days.

(21) Appl. No.: 16/315,028

(22) PCT Filed: Dec. 2, 2016

(86) PCT No.: PCT/EP2016/079665
§ 371 (c)(1),
(2) Date: Jan. 3, 2019

(87) PCT Pub. No.: WO2018/006987
PCT Pub. Date: Jan. 11, 2018

(65) Prior Publication Data
US 2020/0183092 A1 Jun. 11, 2020

(30) Foreign Application Priority Data
Jul. 8, 2016 (CH) ....................................... 0877/16

(51) Int. Cl.
*G02B 6/38* (2006.01)
(52) U.S. Cl.
CPC ........... *G02B 6/381* (2013.01); *G02B 6/3831* (2013.01); *G02B 6/3849* (2013.01)
(58) Field of Classification Search
CPC .......................... G02B 6/3831; G02B 6/3849
See application file for complete search history.

(56) References Cited

U.S. PATENT DOCUMENTS

| 5,481,634 A | 1/1996 | Anderson et al. |
| 6,142,676 A * | 11/2000 | Lu .................. G02B 6/3807 385/60 |

(Continued)

FOREIGN PATENT DOCUMENTS

| EP | 1 072 920 A1 | 1/2001 |
| EP | 1 114 346 A1 | 7/2001 |

(Continued)

OTHER PUBLICATIONS

European Patent Office, English language version of a European Office Action for European Application No. 16815752.7 (EPO Forms 2001 and 2906), dated Jul. 8, 2020 (9 pages).

*Primary Examiner* — Andrew Jordan
(74) *Attorney, Agent, or Firm* — Pauley Erickson & Swanson

(57) ABSTRACT

An optical plug connector (1) having a base body (2) extending in a longitudinal direction (x) with a front end (24) having a first opening to receive a ferrule (7) protruding above the front end (24) of the base body (2) and a rear end (25) having a second opening to receive an optical cable. An articulated locking arm (4) is formed on the front end (24) of the base body (2) and protrudes obliquely toward the rear. A cap (10) is arranged at the base body (2) in front of the articulated locking arm (4) and pivotable about a hinge axis (20) of a hinge (19) to protect the ferrule (7) in a closed position and release the ferrule (7) in an open position. The cap (10) is arranged above the ferrule (7) and in front of the locking arm (4) in a transversal direction (y).

20 Claims, 4 Drawing Sheets

(56) References Cited

U.S. PATENT DOCUMENTS

| | | | |
|---|---|---|---|
| 6,866,425 B2 | 3/2005 | Zimmel et al. | |
| 7,261,472 B2 * | 8/2007 | Suzuki | G02B 6/3807 |
| | | | 385/60 |
| 7,283,718 B2 * | 10/2007 | Zaina | G02B 6/3849 |
| | | | 385/139 |
| 8,221,007 B2 * | 7/2012 | Peterhans | G02B 6/3893 |
| | | | 385/53 |
| 8,317,407 B2 * | 11/2012 | Hioki | G02B 6/3849 |
| | | | 385/73 |
| 9,632,257 B2 * | 4/2017 | Coggi | G02B 6/3849 |
| 2004/0161204 A1 * | 8/2004 | Zimmel | G02B 6/3825 |
| | | | 385/73 |
| 2005/0147358 A1 | 7/2005 | Zaina et al. | |
| 2006/0153503 A1 | 7/2006 | Suzuki et al. | |
| 2011/0058773 A1 * | 3/2011 | Peterhans | G02B 6/3893 |
| | | | 385/76 |
| 2011/0206325 A1 | 8/2011 | Hioki et al. | |
| 2015/0147033 A1 | 5/2015 | Coggi et al. | |
| 2020/0183092 A1 * | 6/2020 | Gadmer | G02B 6/3849 |

FOREIGN PATENT DOCUMENTS

| | | |
|---|---|---|
| WO | WO 98/53347 | 11/1998 |
| WO | WO 2009/135787 A1 | 11/2009 |
| WO | WO 2014/118225 A1 | 8/2014 |

* cited by examiner

OPTICAL CONNECTOR HAVING PIVOTABLE CAP PROTECTING FERRULE

BACKGROUND OF THE INVENTION

Field of the Invention

The present invention is directed to the field of plug connectors, in particular plug connectors for optical cables.

Discussion of Related Art

Plug connectors for optical cables are known from the prior art. So-called LC connectors are likewise known. In a further sense, these are push-pull connectors which have a high packing density. Corresponding connectors are manufactured by the applicant but are also available from a wide variety of other manufacturers.

WO09135787A1 relates to a previous, closely related patent application by the same applicant as the present invention, disclosing a connector designed in such a way that it can latch into a respective socket. Locking shoulders which project laterally from a locking arm are snapped into a rear-engagement means in the socket and thus prevent the connector from unintentionally slipping out of the socket. For unlocking purposes, the locking arm can be pressed against the base body in such a way that the locking shoulders are moved out of the rear-engagement means and thus release the connector so that it can be removed from the socket. The base body has a continuous opening in which an optical fiber is arranged. At the front end, the optical fiber issues into a ferrule which is mounted in a resilient manner in the longitudinal direction and is usually composed of ceramic. At the rear end, the connectors generally have a crimping neck which serves for the connection of a cable jacket of the optical cable.

Generally, an optical ferrule is a cylindrical tube made from material such as ceramic which includes a central bore for receiving a portion of the optical fibre. If not secured in a mating assembly, the exposed ferrule is in danger to be damaged during handling of the connector by collisions or impacts or suffer from scratches or kinks. Even smaller damages may cause further problems since the ferrules have to maintain strict tolerances for the proper connection to ensure a good signal transfer with a low loss. Furthermore, dust, water or the like may contaminate the ferrule and disturb the signal transfer even further. Accordingly, a proper protection of the ferrule is advantageous, when not engaged with the mating socket part.

From the prior art, several dust caps or covers are known for optical connector assemblies which can be divided in caps that can be completely removed from the connector and caps that are moveably (e.g. slideably) attached to the connector and that can be reused to cover the ferrule after it has been disconnected from the mating portion. Caps that can be completely removed from the connector are merely used during the first installation since they have the disadvantage that at the time being when the connector is disconnected from the mating portion the cap is usually not present anymore and the ferrule remains unprotected. Some known closing devices further include shutter-type mechanisms which are activated by external means. However, while such shutter-type mechanisms effectively block optical transmission, they often do not provide sufficient protection from outside contaminants such as dust or dirt. Furthermore, the separation of the opening/closing mechanism of the protection closure and the connecting mechanism of the ferrules is disadvantageous since this results in an unnecessary exposure of the optical ferrule. Therefore, an automatically engagement of the opening mechanism (respective closure mechanism) upon the connection (respectively disconnection) of the optical connector is desirable.

One example of these connector types is the WO9853347, which discloses a fiberoptic connector which can be received within an adapter and has a cover on the connector housing that pivots between an open and closed position to expose or cover the optical fiber contained within the connector. Longitudinal guides of the connector are received cooperating with longitudinal guides of the adapter to direct the connector into the adapter in a prescribed alignment. A cam pin is carried on the adapter to engage a cam pin receiving slot on the cover to urge the cover to the open position as the connector is inserted into the adapter.

US20150147033 relates to a plug connector for optical conductors including a protective apparatus for protecting the end face of the plug pin and for moving from a closed position with a covered end face to an open position with an exposed end face by inserting the plug part into the socket part and interacting with the same. The protective apparatus preferably comprises a closure flap which, in particular, is in the form of a cap. Hereby, the closure flap is advantageously mounted on the plug part in a pivotable and/or displaceable manner by means of a guide element which is guided in a guide slot in the plug part. The closure flap comprises at least one control element which can interact or interacts with a control surface of the socket part during insertion of the plug part in such a way that the closure flap can be moved from the closed position to the first open position during insertion.

WO14118225 relates to a fiber optic connector with a shutter mounted at the front end of the connector body. The shutter is moveable relative to the connector body between an open and a closed position. The fiber optic connector includes an optical fiber having an end face that is accessible at the front end of the connector body when the shutter is in the open position. The fiber optic connector also includes a cleaning material provided at an inner side of the shutter that covers the end face of the optical fiber when the shutter is in the closed position.

U.S. Pat. No. 6,866,425 discloses a fiber optic device with a housing for an optical ferrule. The housing comprises a removable front cover to permit access to the optical path provided by the ferrule. For the connection of the connector and a respective adapter, an alignment channel is provided on the connector which receives an alignment rail in an opening of the adapter to properly position connector within the same. Furthermore, a pin channel placed on the connector receives a pin within the adapter which engages and opens the front cover. For disconnecting the connector, a catch mounted on the connector with a deformable arm provides a release mechanism for holding connector and adapter together when connector is fully inserted within the opening of the adapter.

US20110206325 is directed to an optical connector with a shutter covering the front outer periphery. For less load on the shutter and secure motions of the shutter without damaging a ferrule, a rear stopper guide and a spring guide covering an upper side of a hold of an optical plug, and an outer cover covering a front outer periphery of the hold are provided. The shutter is automatically opened and closed by a mechanism in accordance with a rack and pinion system and can be swung from a lid close position to a lid open position. Hence, the mechanism shields the ferrule at a time when the connector is not fitted to an optical adapter plug and automatically opens the shutter at a time when it is fitted to the plug. The outer cover is formed in an approximately rectangular tubular shape which is the same shape as that of an outer periphery of a housing of the optical connector adapter and is structured such that an extension portion can slidably move on an upper surface of the spring guide.

Known shutter mechanisms have often the disadvantage that they do not close automatically if disconnected from a corresponding plug. Furthermore, most of the technical solutions are using a specific socket with individual engagement means to open or close the connector cap and hence, no standardized socket can be used in combination with the connectors. Generally, these standardized sockets further receive a ferrule from the connector which normally protrudes above the front end of the base body and therefore needing a protection mechanism that covers and uncovers the protruding ferrule.

One object of the invention is to improve the connectors known from the prior art. A further object of the invention is to specify an optical connector which is distinguished by simplified but robust design and operability.

SUMMARY OF THE INVENTION

One embodiment of the invention concerns an optical plug connector having a base body extending in a longitudinal direction with a front end and a rear end. The front end has a first opening to receive a ferrule which normally protrudes above the front end of the base body. The rear end has a second opening to receive an optical cable.

Preferably, the connector features a standardized locking mechanism comprising an articulated locking arm. The locking arm is integrally formed on the front end of the base body and protrudes obliquely toward the rear. Hereby, locking shoulders which project laterally from the locking arm are snapped into a rear-engagement means in a corresponding standardized socket and thus prevent the connector from unintentionally slipping out of the socket. For unlocking purposes, the locking arm can be pressed against the base body in such a way that the locking shoulders are moved out of the rear-engagement means and thus release the connector so that it can be removed from the socket.

In a further variation of the invention the optical connector may additionally comprise a collar-like displacement element which surrounds or is attached to the rear region of the base body at least in regions and can be displaced in relation to said base body in the longitudinal direction. The unlocking element is operatively connected to the locking arm. The operatively connected locking arm can be unlocked by the unlocking element being displaced in an unlocking direction.

A preferred variation of the invention features a cap which is arranged at the base body to protect the ferrule in a closed position and releases the ferrule in an open position. Hereby, the cap may be arranged in front of the articulated locking arm, pivotable about a hinge axis of a hinge arranged above the ferrule and in front of the locking arm. The hinge axis is preferably arranged in a transversal direction with respect to the longitudinal direction of the base body. If the cap is pivoted around the hinge axis of the hinge, the cap does not intercept with the ferrule which protrudes above the front end of the base body. Therefore, the inner contour of the cap may be formed so that the cap and the ferrule do not collide in a negative manner. The invention offers the advantage that the cap can be formed in such a way, that the cap uses a minimal possible space, closing marginally around the ferrule. Preferably, the material of the cap is metal and can be produced by pressure casting. However, other materials are possible.

In one variation of the invention, the cap comprises at least one rocker arm extending in the longitudinal direction (x) and above the cap when the cap is in the closed position. However, in the preferred variation, the cap advantageously comprises two rocker arms arranged on either side of the cap. Hereby, the at least one rocker arm in a closed position does not fit within the contour of the base body and the locking arm and hence interacts with the front surface of the socket during insertion of the connector plug in the socket. Thereby, the at least one rocker arm is pressed with a rounded side against a front wall of a standardized socket which induces a tilting of the rocker arm, respectively the cap, around the hinge moving the cap from a closed to an open position. Hence, the cap is automatically folded backwards in such a way that the connector with the cap in an open position fits neatly in the opening of the socket. The at least one rocker arm may be designed to form part of the hinge, however, other attachment means to the hinge are possible.

In a further variation of the invention, the at least one rocker arm with the cap in the open position is arranged in at least one recess of the base body to fit in a contour of the base body and the locking arm and hence in the opening of a standardized socket. Hereby the contour is defined by the axial projection in the longitudinal direction, respective the direction of the interconnection, of the outer shape of the base body and the locking arm.

Preferably, the cap in the open position extends in this longitudinal direction by maximal 0.5 mm above said contour of base body and the locking arm and hence, the optical plug connector with the cap in an open position fits neatly within the respective socket for the plug connector, without needing any additional space or alteration of the socket design.

In another variation of the invention, the cap is preferably arranged pivotable against the force of at least one spring to automatically close the cap after the separation of the connector plug of the socket. In a further variation of the invention the at least one spring is clamped to the base body and at least partially encompasses the locking arm.

In a preferred variation of the invention, the at least one spring comprises at least one helically coiled section and at least one spring leg which interacts with the cap by a slide, so that the cap can move independently from the spring.

In one possible embodiment, the slide is arranged between the rocker arm and the cap and is at least partially spiral-like curved with respect to the hinge axis. Preferably, the spring leg is arranged and slideably guided in a notch of said slide, transmitting the force of the spring on the cap. However, other guiding means, such as bores or grommets, are possible.

In a further variation of the invention the spring features two helically coiled sections, which may be arranged opposite to each other and are interconnected by a spring middle section.

BRIEF DESCRIPTION OF SEVERAL VIEWS OF THE DRAWINGS

The herein described invention will be more fully understood from the detailed description of the given herein below and the accompanying drawings, which should not be considered as limiting to the invention described in the appended claims.

DETAILED DESCRIPTION OF THE INVENTION

The foregoing summary, as well as the following detailed description of the preferred embodiments, are better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
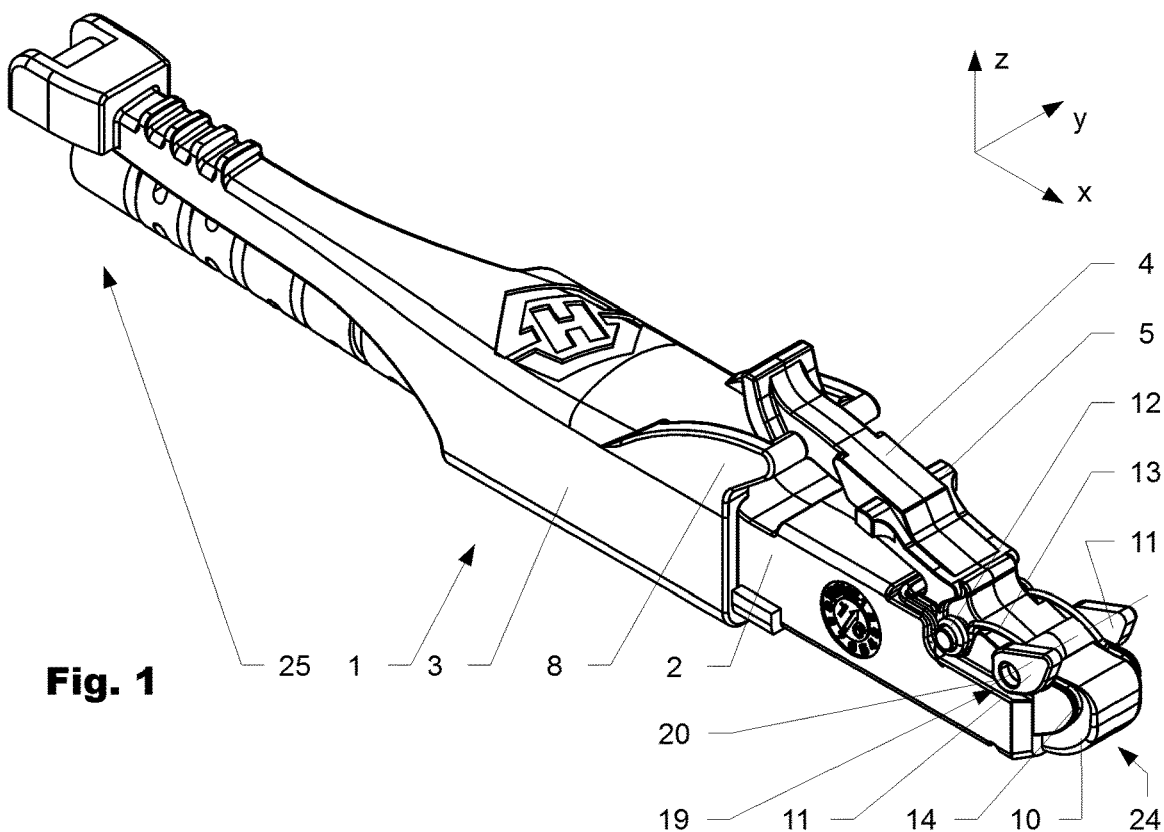
FIG. 1 schematically shows a preferred variation of the connector according to the present invention in a perspective view.
Figure 2:
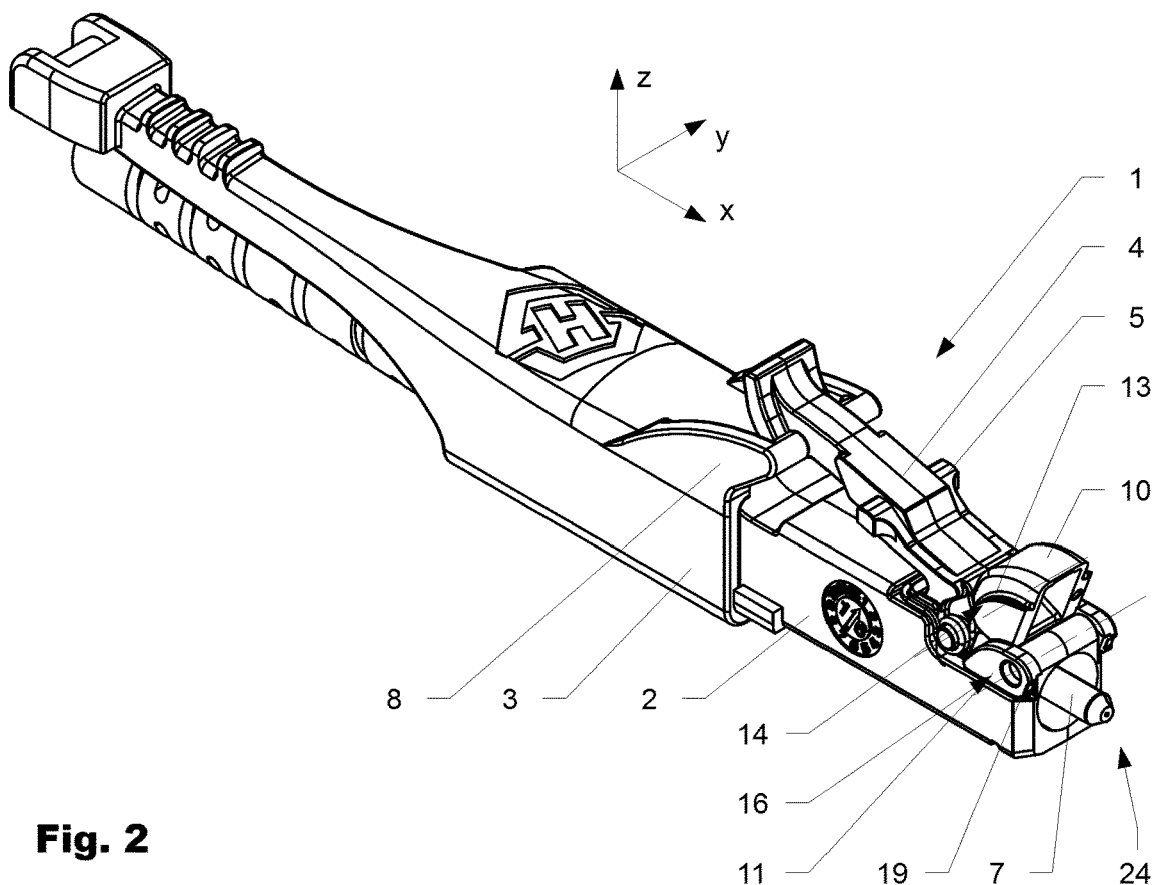
FIG. 2 schematically shows the connector according to FIG. 1 with the cap pulled rearwards.

FIG. 1 to FIG. 9 show different variations of the connector 1 according to the invention having a base body 2 with a front end 24 and a rear end 25 and a locking arm 4 which protrudes in an elastically resilient manner obliquely toward the rear from the front end 24 of the base body 2. The base body 2 has a continuous opening in which an optical fiber is arranged. As illustrated, the optical fiber issues into a ferrule 7 at the front end 24 of the base body 2 which is also mounted in a resilient manner in the longitudinal direction and is protruding above the front end 24 of the base body 2. FIG. 1 and FIG. 2 show a first variation of the invention. In both Figures, a cap 10 is present: FIG. 1 illustrates the cap 10 in a closed position protecting the ferrule 7, meanwhile FIG. 2 illustrates the cap 10 in an open position exposing the ferrule 7 for the interconnection. In this variation of the invention, the cap 10 comprises two rocker arms 11 on either side of the cap and is secured in place by a spring 12. Hereby, the spring 12 is in a less tensioned state when the cap 10 is in a closed position, covering and hence protecting the ferrule 7. In an open position, when the cap 10 reveals the ferrule 7, the spring 12 is in a more tensioned state and has to be kept in the open position against a certain force during the interconnection, as described hereinafter in more detail.

The connector 1 according the present variation further features standardized locking shoulders 5, which project laterally from the locking arm 4 and are snapped into a rear-engagement means in the corresponding socket 9 (not shown here) to prevent the connector 1 from unintentionally slipping out of the socket 9. For unlocking purposes, the locking arm 4 can be pressed against the base body 2 in such a way that the locking shoulders 5 are moved out of the rear-engagement means and thus release the connector 1 so that it can be removed from the socket 9. At the rear end 25, the connector 1 has a crimping neck which serves for the connection of a cable jacket of an optical cable.

Figure 3:
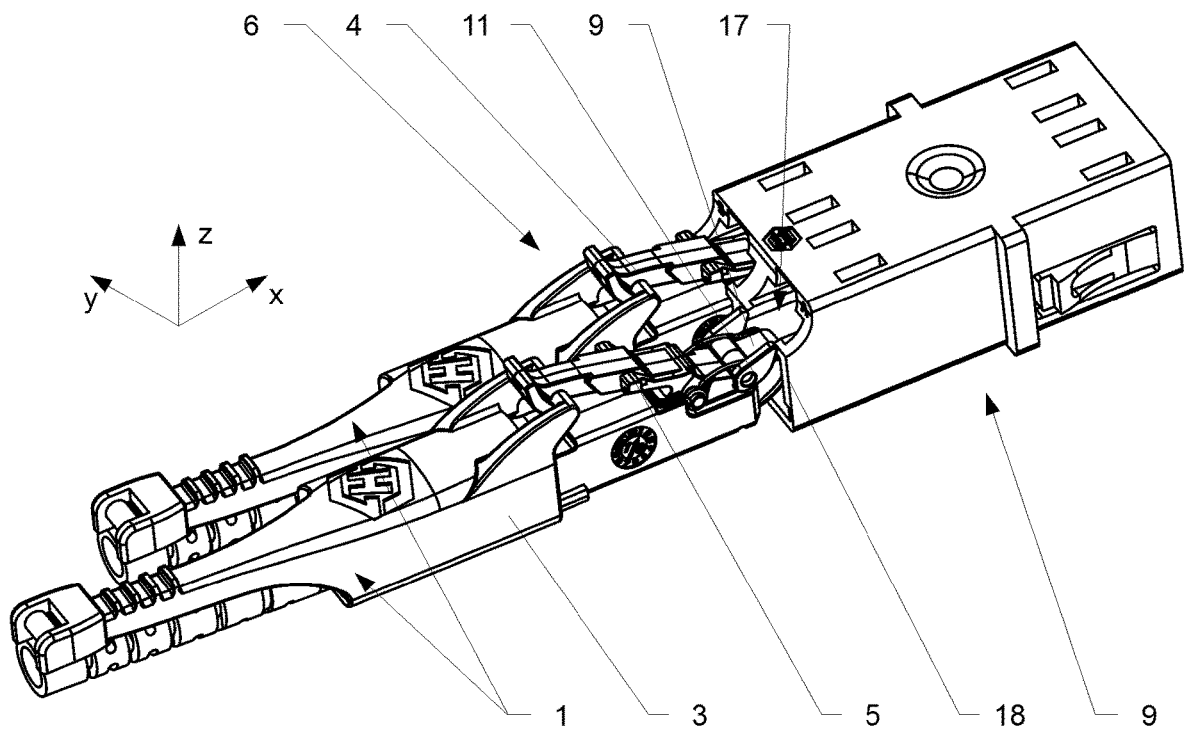
FIG. 3 schematically shows two connectors according to the present invention interconnected to a socket in a perspective view.
Figure 4:
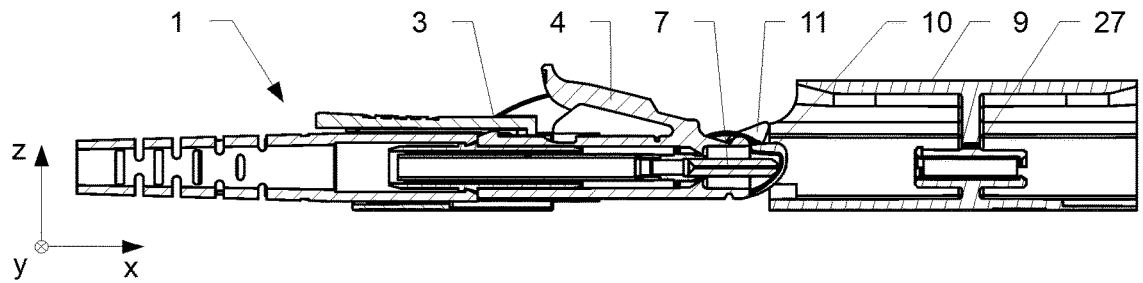
FIG. 4 schematically shows a first section view of the connector according to FIG. 3 (cap down)
Figure 5:
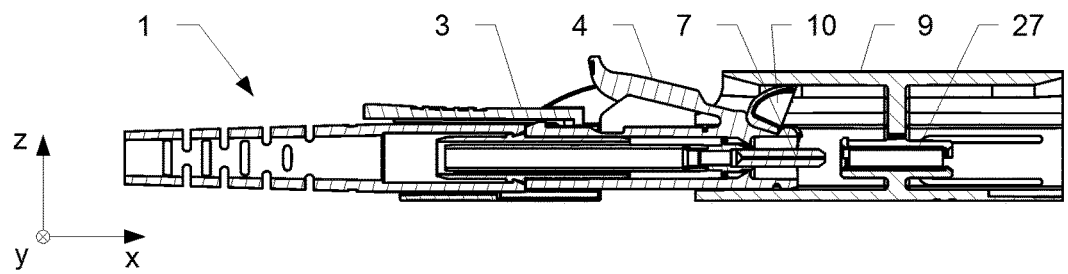
FIG. 5 schematically shows a second section view of the connector according to FIG. 3 (cap pulled rearwards)

In the shown variations, an additional unlocking element 6 is further arranged on the base body 2. Said unlocking element 6 has a displacement element 3 which at least partially surrounds the base body 2, and which can be displaced in relation to said base body 2 in the longitudinal direction (x direction). The displacement element is operatively connected to the locking arm 4. A clip 8 which is integrally formed on the displacement element 3 or is operatively connected to said displacement element 3 serves to transform the movement of the displacement element 3 into a force which serves to unlock the connector 1. The interconnection process is illustrated in FIG. 3, showing first and a second connector 1 according to a variation of the present invention for the interconnection to a conventional socket 9. Hereby, the first connector 1 is shown in a state where the connector 1 is not yet interconnected and the cap 10 is still in the closed position, covering the ferrule 7. The second connector 1 is further inserted into the socket 9 and illustrated in the process of being interconnected, with the cap 10 already in the open position, exposing the ferrule 7 for the insertion into a ferrule holder 27. A section view of a connector 1 with the socket 9 and a cap 10 still in the closed position can be seen in FIG. 4, meanwhile a second section view of the connector 1 and the socket 9 with the cap 10 in an open position can be seen in FIG. 5. For the interconnection of a connector 1 with a socket 9, the connector 1 is aligned with an opening 17 of the socket 9. In the preferred variation of the invention, the rocker arms 11 of the cap 10 in a closed position initially do not fit in the opening 17 of the socket 9 and are pressed during the insertion against the front wall 18 of the socket 9 with a side of the rocker arms 11. By doing so, the shape of the side of the rocker arms 11 induces a tilting of the cap 10 against the force of the spring 12 and around a hinge 19 from the closed to the open position during the insertion of the connector 1 into the socket 9. Preferably, the cap geometry and form requires a minimal space, while still covering the ferrule 7 entirely in a closed position. During the opening of the cap 10, the cap 10 tilts around the hinge 19 whereby the inner contour of the cap 10 is not intercepting the ferrule 7 which protrudes above the front end 24 of the base body 2.

After insertion, the cap 10 is in a fully open position with the rocker arms 11 folded backwards in recesses 16 of the base body 2. Due to the fact that the rocker arms 11 are placed within these recesses 16, the connector 1 and the cap 10 fit neatly in the opening 17 of the socket 9, as it can be seen in FIG. 5 as well as in the in the front view of the connector in FIG. 8. Hereby, the rocker arms 11 are held in the recesses 16 and hence keeping the cap 10 in the open position by a contact of the rocker arms to an inner wall of the socket 9. This contact prohibits the backwards movement of the cap 10 in a closed position as it would be initiated by the force of the spring without the inner socket wall being present. If the connector is inserted even further, the locking shoulders 5 lock the plug connector 1 in correspondingly designed slots in the socket 9.

For the disconnection of the connector 1 from the socket 9, the displacement element 3 has to be manually pulled in the direction of the rear end of the connector 1. The unlocking forces, and the removal forces which are required to remove the plug connector 1 from the socket 9 are normally transmitted from the displacement element 3, by means of the clip 8, to the locking arm 4, and from there to the base body 2. The locking arm is first unlocked by pulling the displacement element, followed by the base body of the connector being pulled out of the socket. Hereby, the clip 8 exerts a force on the locking arm 4 and pulls said locking arm 4 downward in the direction of the base body 2. The locking shoulders 5 are likewise displaced downward, and are therefore unlocked and the connector 1 is released. If the connector 1 is pulled further out of the socket 9 the rocker arms 11 of the cap 10 are freed. In the instant the cap 10 and the rocker arms 11 are free to tilt, they tilt automatically back in the closed position around the hinge 19, initiated by the force of the spring 12, since the spring 12 is in a less tensioned state if the cap 10 is in a closed position and in a more tensioned state if the cap 10 is in an open position.

Figure 6:
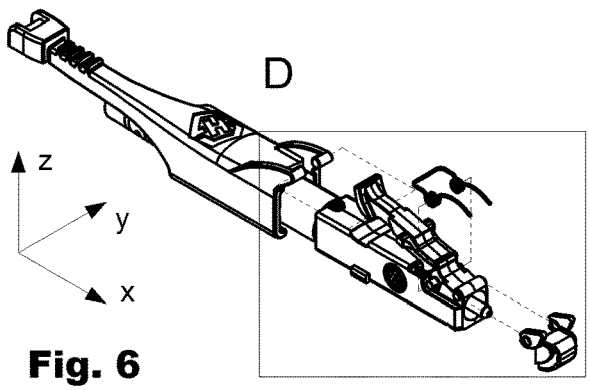
FIG. 6 schematically shows a variation of the connector according to the invention with a disassembled cap and spring.
Figure 7:
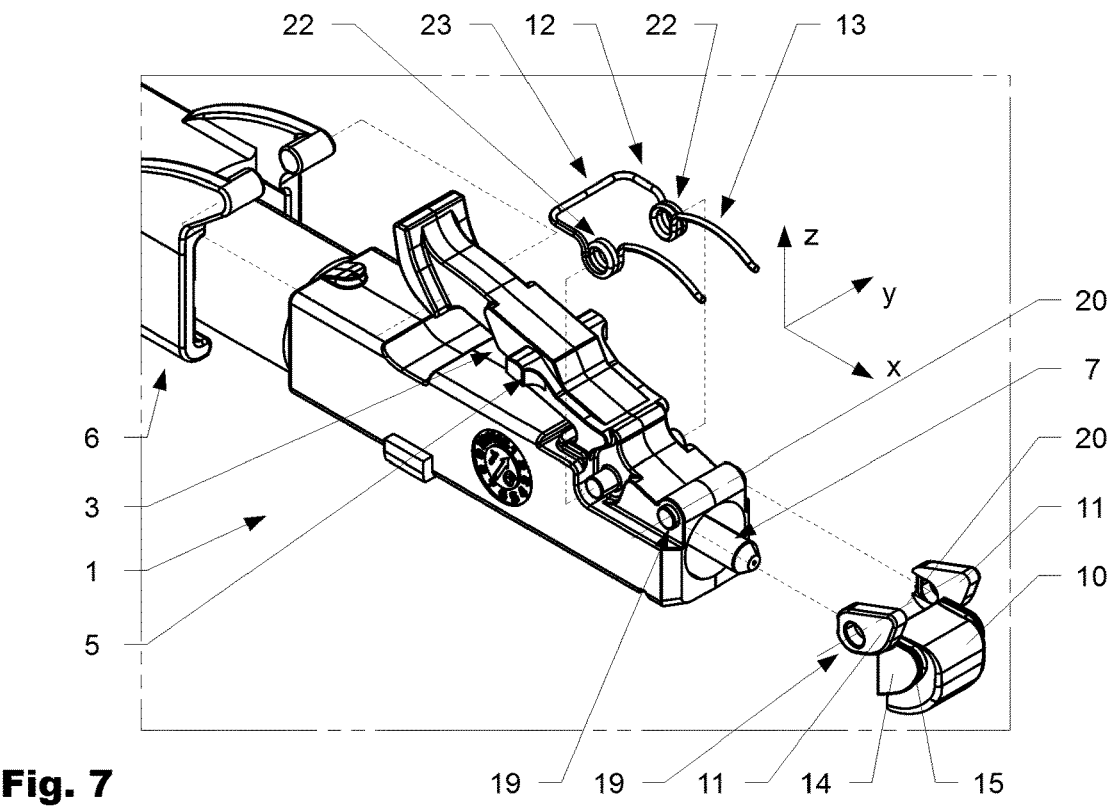
FIG. 7 schematically shows details of the disassembled cap of FIG. 6
Figure 8:
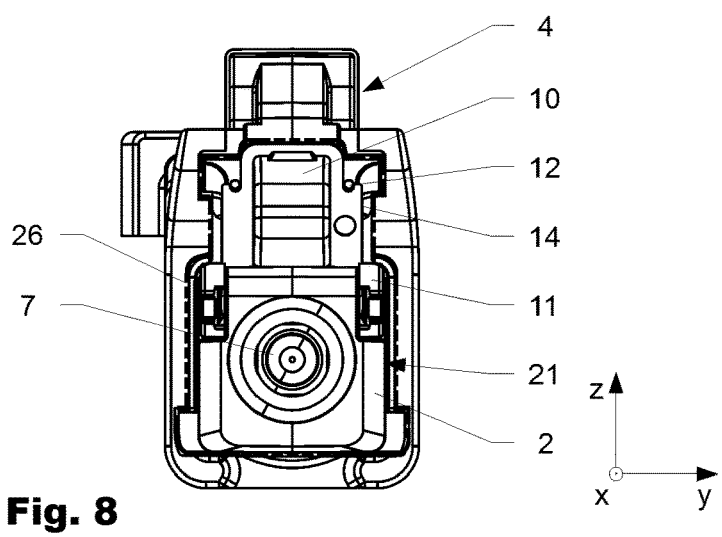
FIG. 8 illustrates a front view of a variation of the connector with a cap
Figure 9:
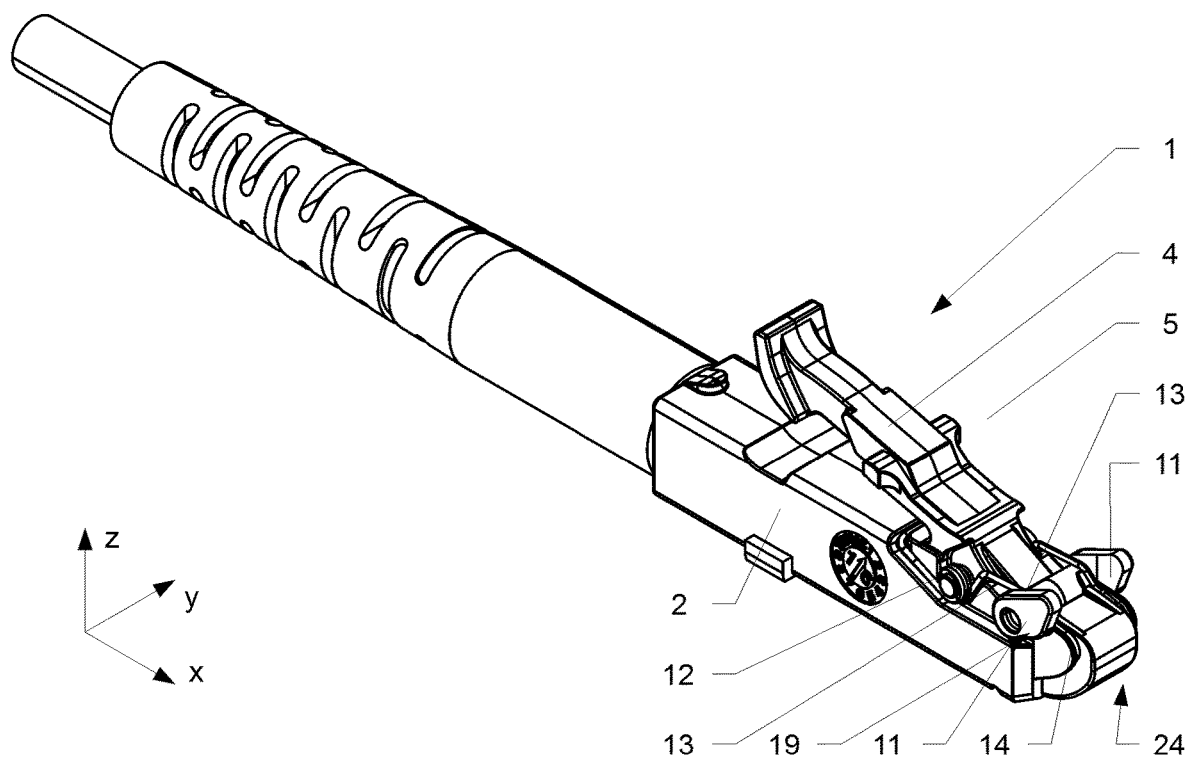
FIG. 9 schematically shows a further variation of a connector with a cap.

FIG. 6 illustrates the interconnection of the spring 12 and the cap 10 on the base body 2 according to one variation of the invention. FIG. 7 shows details of the cap 10 and the structure of the spring 12 from FIG. 6. The cap 10 is arranged in front of the locking arm 4 pivotable about the axis 20 of the hinge 19 against the force of a spring 12. The spring 12 is hereby clamped on the base body 2 with two helically coiled sections 22. A middle section 23 of the spring 12 may further encompass the locking arm 4 to support itself against the base body 2. Two spring legs 13 are preferably arranged in a notch 15 of a slide 14 of the cap 10 so that during opening and closing of the cap 10, the spring legs slide within this notch 15. Advantageously, the slide 14 is partially spiral-like curved with respect to the hinge axis 20. The spring legs 13 may have a more rounded shape as e.g. shown in the variation of the invention illustrated in FIG. 1 and FIG. 2. A further variation of the spring is illustrated in FIG. 9, with the spring legs 13 having intermediate straight parts while still fitting at its end to the shape of the slide 14. This shape may be advantageous in terms of production complexity.

The invention claimed is:

1. An optical plug connector comprising:
   a. a base body (2) extending in a longitudinal direction (x) with
      i. a front end (24) having a first opening to receive a ferrule (7) protruding above the front end (24) of the base body (2) and
      ii. a rear end (25) having a second opening to receive an optical cable,
   b. an articulated locking arm (4),
   c. a cap (10) arranged at the base body (2) in front of the articulated locking arm (4) and pivotable about a hinge axis (20) of a hinge (19) arranged above the ferrule (7) and in front of the locking arm (4) in a transversal direction (y), wherein the cap (10) comprises at least one rocker arm (11) extending in the longitudinal direction (x) and above the cap (10) when the cap (10) is in the closed position;
   d. wherein the cap (10) protects the ferrule (7) in a closed position and releases the ferrule (7) in an open position.

2. The optical plug connector (1) according to claim 1, wherein the cap (10) is pivotable against the force of a spring (12).

3. The optical plug connector according to claim 2, wherein the spring (12) is clamped to the base body (2) and at least partially encompasses the locking arm (4).

4. The optical plug connector (1) according to claim 3, wherein the spring (12) comprises at least one helically coiled section (22).

5. The optical plug connector (1) according to claim 4, wherein the spring (12) comprises two helically coiled sections (22) arranged opposite to each other and which are interconnected by a middle section (23).

6. The optical plug connector (1) according to claim 2, wherein the spring (12) comprises at least one spring leg (13) which interacts with the cap (10) by a slide (14).

7. The optical plug connector (1) according to claim 6, wherein the slide (14) is at least partially spiral-like curved with respect to the hinge axis (20).

8. The optical plug connector (1) according to claim 6, wherein the spring leg (13) is arranged in a notch (15) of the slide (14).

9. The optical plug connector (1) according to claim 1, wherein the at least one rocker arm (11) forms part of the hinge (19).

10. The optical plug connector (1) according to claim 1, wherein the at least one rocker arm (11) in the open position of the cap (10) is arranged in at least one recess (16) of the base body (2).

11. The optical plug connector (1) according to claim 1, wherein a slide (14) is arranged between the rocker arm (11) and the cap (10).

12. The optical plug connector (1) according to claim 1, wherein in longitudinal direction (x) the cap (10) in the open position extends by maximal 0.5 mm above a contour (26) of the base body (2) and the locking arm (4).

13. The optical plug connector (1) according to claim 1, wherein in longitudinal direction (x) the spring (12) in the open position extends by maximal 0.5 mm above a contour (26) of the base body (2) and the locking arm (4).

14. The optical plug connector (1) according to claim 1, wherein the articulated locking arm (4) is formed on the front end (24) of the base body (2) and protrudes obliquely toward the rear end.

15. A method for interconnecting an optical plug connector (1) to a socket (9), comprising the following method steps:
   a. providing an optical plug connector (1) having a base body (2) with a ferrule (7) and a cap (10) protecting the same, which is arranged at the base body (2) pivotable against a force of a spring (12) about a hinge axis (20) of a hinge (19);
   b. aligning the connector (1) comprising a cap (10) in a closed position with an opening (17) of the socket (9), wherein the cap (10) comprises at least one rocker arm (11) extending in a longitudinal direction (x) and above the cap (10) when the cap (10) is in the closed position;
   c. building up contact between the at least one rocker arm (11) on the closed cap (10) and a front wall (18) of the socket (9);
   d. pushing the connector (1) further into the opening of the socket (9) so that the at least one rocker arm (11) and the cap (10) are pivoted against the force of the spring (12) around the hinge (19) in an open position where the cap (10) is stored in a recess (16) of the base body (2);
   e. inserting the cap (10) stored in the recess (16) on the base body (2) into the opening (17) of the socket (9) and interconnecting the ferrule (7).

16. The method according to claim 15, whereby after the separation of the optical plug connector (1) from the socket (9) the force of the spring (12) automatically pivots the cap (10) back to a closed position, protecting the ferrule (7).

17. The method according to claim 15, whereby at least one locking shoulder (4) of the base body (2) engages with the socket (9) during insertion and thereby secures the optical plug connector (1) in the socket (9).

18. The method according to claim 17, whereby for unlocking purposes an unlocking element (6) is used, that detaches the at least one locking shoulder (4) from the socket (9) so that the optical plug connector (1) is removed from the socket (9).

19. An optical plug connector comprising:
   a. a base body (2) extending in a longitudinal direction (x) with
      i. a front end (24) having a first opening to receive a ferrule (7) protruding above the front end (24) of the base body (2) and
      ii. a rear end (25) having a second opening to receive an optical cable,
   b. an articulated locking arm (4),
   c. a cap (10) arranged at the base body (2) in front of the articulated locking arm (4) and pivotable about a hinge axis (20) of a hinge (19) arranged above the ferrule (7) and in front of the locking arm (4) in a transversal direction (y), wherein the cap (10) is pivotable against a force of a spring (12), and the spring (12) is clamped to the base body (2) and at least partially encompasses the locking arm (4);
   d. wherein the cap (10) protects the ferrule (7) in a closed position and releases the ferrule (7) in an open position.

20. The optical plug connector (1) according to claim 19, wherein the spring (12) comprises at least one spring leg (13) which interacts with the cap (10) by a slide (14).

* * * * *